Dec. 4, 1934.  L. E. GARFIELD  1,983,283
BEARING FOR DRILL CUTTERS
Filed Sept. 16, 1933
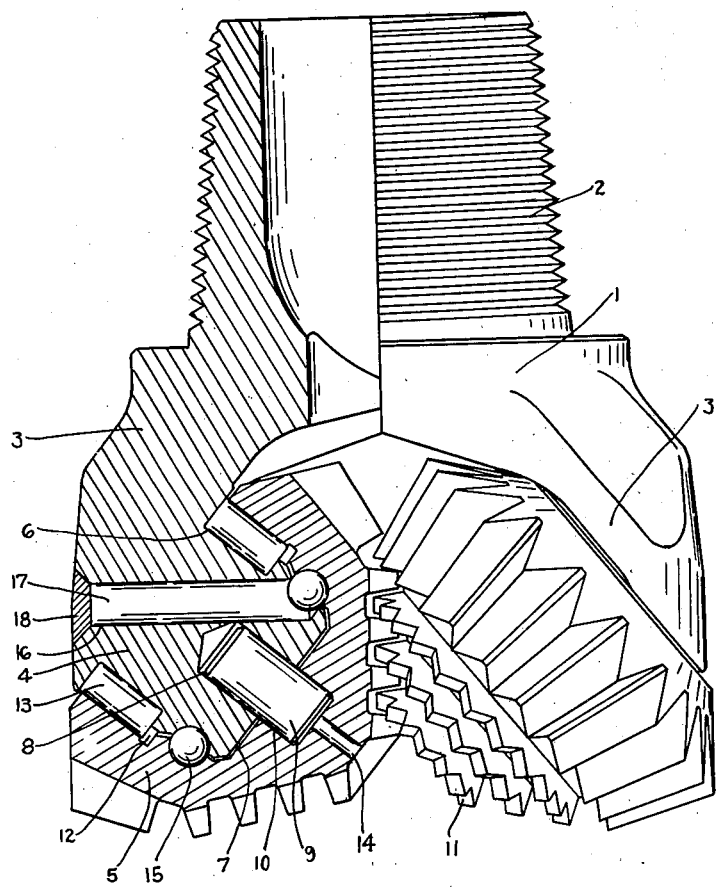
L. E. GARFIELD   INVENTOR
BY Jesse R. Stone
ATTORNEY Patented Dec. 4, 1934

1,983,283

UNITED STATES PATENT OFFICE 1,983,283

BEARING FOR DRILL CUTTERS

Lewis E. Garfield, Houston, Tex., assignor to Hughes Tool Company, Houston, Tex., a corporation of Texas Application September 16, 1933, Serial No. 689,721

7 Claims. (Cl. 255—71)

My invention relates to bearings for deep well drills and more particularly the bearings for so called "cones" which surround the end of the bearing upon which they are mounted.

On drills of this character there are normally two or more cutters mounted on shafts on the bit head which shafts are inclined downwardly and inwardly toward the central axis of the drill. As the thrust of the drill is downwardly, this force is taken upon bearings set at an inclination to the direction of thrust, and provision must be made to assure that the cutter rotates freely on the shaft and that the cutter also be held from a tendency to be twisted or skewed longitudinally around the end of the shaft. There must be means at the end of the shaft to take up the lateral exponent of the thrust which means must be tough and not easily fractured, and which must also be resistant to abrasion.

It is an object of the invention to provide an insertible thrust-taking member at the end of the cutter shaft which can be made of tough steel with a hard facing thereon resistant to abrasion and which serves thereon as a smooth antifriction bearing surface.

It is also an object to supply antifriction rolling bearings and to mount said bearings so that they will remain in alignment in the raceway and not tend to move into an inclined position with the longitudinal axis of the roller out of parallelism with the shaft axis.

In the drawing is shown a side view partly in elevation and partly in central longitudinal section of a well drill embodying the invention.

The drill includes a body 1 having an upper tapered threaded shank 2 for attachment by a collar or tool joint with the drill stem. On the body 1 are two downwardly-diverging legs 3. There is an integral downwardly and inwardly inclined shaft 4 on each leg which furnishes a bearing for a cutter 5.

The shaft 4 has an outboard roller bearing race 6 adjacent its juncture with the leg 3, the shaft being recessed somewhat for that purpose. The shaft tapers slightly and its forward end is squared off at 7 and an axial recess 8 is formed therein to receive an insertible stationary bearing pilot 9.

The bearing 9 is a cylindrical plug adapted to be driven into position in the shaft. It is made separately so that it may be of special tough steel to resist lateral strain without cracking and has on its outer projecting end a facing of hard abrasion resisting material such as Stellite or the like shown at 10.

The cutter 5 is of the usual exterior construction with teeth 11 thereon adapted to interfit with teeth on the adjacent cutter. The interior is shaped to fit over the bearing shaft. It is provided with a clearance at 12 at the ends of the rollers 13 so as not to contact with the ends of the said rollers and exert a friction thereon tending to skew them out of alignment parallel with the shaft. The cutter has a small clearance all around the shaft to allow slush to circulate around the bearings and a small opening 14 at the apex of the cone is provided to permit the entrance of mud freely thereto.

The cutters are secured rotatably upon the shafts by a row of balls 15 between the ends of the shaft. These balls engage partly in a groove in the cutter and partly in a similar groove in the shaft. They are introduced into the grooves, when the cutter is on the shaft, through a horizontally arranged opening 17 diagonally of the shaft. When the balls have been inserted, the opening is filled by a plug 17 which is locked in position by a bond of welding material 18. It will be noted that the inner end of the plug 17 is slightly hollowed off to form part of the raceway in which the balls 15 may roll.

It is to be understood that the bit head is produced cheaply by forging or casting and must be machined and then heat treated or processed. Carburizing the cutter shaft makes it hard but also somewhat brittle. By making the bearing pilot 9 separately this member may be made of a separate composition and is hence of better steel, tough and resistant to fracture and faced with a bearing surface resistant to abrasion. The bit head and the inserted pilot are separately treated and then the pilot is placed in position, as shown, so as to take up the lateral thrust at the end of the pin. The inserted pilot pin may be fixed rigidly in position or may be allowed to fit sufficiently loose to prevent its rotation in its socket. As this pin is specially prepared it acts to resist wear and breakage until the cutter is itself worn out.

It is to be noted that, although the cutter is spaced from the shaft by the rolling bearings around the body of the shaft, it fits the pilot insert more closely, but it is to be understood that slush entering the opening 14 may pass around the insert without difficulty. The polished hard end of the insert relieves friction so that it will not impede the rolling of the cutter thereon.

What I claim as new is:

1. A drill bit including a head, downwardly and inwardly inclined shafts thereon, bearing races in the sides of said shafts, a pilot bearing pin inserted in a recess at the free end of each of said shafts, bearings in said races and a frusto-conical cutter shell on each of said shafts completely enclosing said bearing pins therein and, held in rotatable position on said shafts by said bearings.

2. A drill bit including a head, downwardly and inwardly inclined shafts thereon, bearing races in the sides of said shafts, a pilot bearing pin inserted in a recess at the free end of each of said shafts, said pin being of tough steel having a facing of hard abrasion resisting material thereon, bearings in said races and a frusto-conical cutter shell on each of said shafts, held in rotatable position on said shafts by said bearings.

3. A drill bit including a head, shafts projecting downwardly from said head, bearing races formed on the periphery of each of said shafts, one adjacent said head to receive bearing rollers and one spaced therefrom to receive a row of balls, an inserted cylindrical projection on the end of said shaft, a cutter fitting over the end of said shaft and having interior raceways therein to receive said rollers and said balls, said balls acting to hold said cutter in position on said shaft.

4. A drill bit including a head, shafts projecting downwardly from said head, bearing races formed on the periphery of each of said shafts, one adjacent said head to receive bearing rollers and one spaced therefrom to receive a row of balls, an inserted cylindrical projection on the end of said shaft, said projection being of tougher quality of steel from that of the shaft and adapted to take the lateral thrust at the end of said shaft, a cutter fitting over the end of said shaft and having interior raceways therein to receive said rollers and said balls, said balls acting to hold said cutter in position on said shaft.

5. A drill bit including a head a cutter shaft thereon, a cutter enclosing one end of said shaft and shaped to fit loosely thereon, a roller bearing race on said shaft adjacent said head, rollers therein with their ends contacting only with said shaft, a row of balls locking said cutter rotatably on said shaft, and an inserted pilot bearing pin at the end of said shaft.

6. A drill bit including a head a cutter shaft thereon, a cutter enclosing one end of said shaft and shaped to fit loosely thereon, a roller bearing race on said shaft adjacent said head, rollers therein with their ends contacting only with said shaft, a row of balls locking said cutter rotatably on said shaft, a cylindrical bearing pin inserted rigidly into a recess in the end of said shaft and projecting therefrom to take lateral thrust from said cutter, said pin being of tougher steel than that of the shaft and faced to resist abrasion.

7. A shaft, a conical cutter shell surrounding the end of said shaft, antifriction bearings between the said shell and the periphery of said shaft, the end of said shaft having a recess, and a separately formed cylindrical plug inserted into said recess to project from said shaft and resist the lateral thrust of said shell, said plug being of tough steel.

LEWIS E. GARFIELD.